(12) United States Patent
Lin et al.

(10) Patent No.: US 11,402,883 B2
(45) Date of Patent: Aug. 2, 2022

(54) SYSTEM AND METHOD FOR DYNAMIC FAN CONTROL IN AN INFORMATION HANDLING SYSTEM

(71) Applicant: DELL PRODUCTS, LP, Round Rock, TX (US)

(72) Inventors: Salus Lin, Taipei (TW); Ping-Sheng Kao, Hsinchu (TW)

(73) Assignee: Dell Products L.P., Round Rock, TX (US)

( * ) Notice: Subject to any disclaimer, the term of this patent is extended or adjusted under 35 U.S.C. 154(b) by 21 days.

(21) Appl. No.: 16/681,099

(22) Filed: Nov. 12, 2019

(65) Prior Publication Data

US 2021/0141428 A1 May 13, 2021

(51) Int. Cl.
*G06F 1/20* (2006.01)
*G05B 15/02* (2006.01)
*G06F 1/26* (2006.01)

(52) U.S. Cl.
CPC .............. *G06F 1/20* (2013.01); *G05B 15/02* (2013.01); *G06F 1/206* (2013.01); *G06F 1/26* (2013.01)

(58) Field of Classification Search
CPC ... G06F 1/20; G06F 1/26; G06F 1/206; G05B 15/02
See application file for complete search history.

(56) References Cited

U.S. PATENT DOCUMENTS

| 9,311,909 | B2 | 4/2016 | Giaimo, III et al. |
| 9,621,989 | B1 | 4/2017 | Garner et al. |
| 2007/0014363 | A1* | 1/2007 | Golas ............... H04N 19/172 375/240.16 |
| 2010/0252358 | A1* | 10/2010 | Rodrigues ............. G06F 1/20 181/206 |
| 2018/0348830 | A1* | 12/2018 | Hou ..................... G06F 1/206 |
| 2020/0383235 | A1* | 12/2020 | Yu ....................... G06F 1/1632 |

FOREIGN PATENT DOCUMENTS

| CN | 1869946 A | * | 11/2006 | |
| JP | 10247123 A | * | 9/1998 | |
| JP | 2003326961 A | * | 11/2003 | |
| JP | 2005018705 A | * | 1/2005 | |
| KR | 20150087122 A | * | 7/2015 | ............. H04R 29/00 |
| TW | 201540167 A | * | 4/2014 | |
| TW | 201540167 A | * | 9/2017 | ............... H05K 7/20 |

\* cited by examiner

*Primary Examiner* — Chad G Erdman
(74) *Attorney, Agent, or Firm* — Larson Newman, LLP

(57) ABSTRACT

An information handling system includes a cooling fan operable in one of a plurality of fan speed levels, and a connector to which a headphone device can be connected. A mode controller sets the cooling fan to a first fan speed levels, receives an indication that the headphone device is connected to the connector, and sets the cooling fan in a second, higher fan speed level in response to receiving the indication.

18 Claims, 4 Drawing Sheets

SYSTEM AND METHOD FOR DYNAMIC FAN CONTROL IN AN INFORMATION HANDLING SYSTEM

FIELD OF THE DISCLOSURE

This disclosure generally relates to information handling systems, and more particularly relates to dynamic fan control in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a cooling fan operable in one of a plurality of fan speed levels, and a connector to which a headphone device can be connected. A mode controller sets the cooling fan to a first fan speed levels, receives an indication that the headphone device is connected to the connector, and sets the cooling fan in a second, higher fan speed level in response to receiving the indication

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
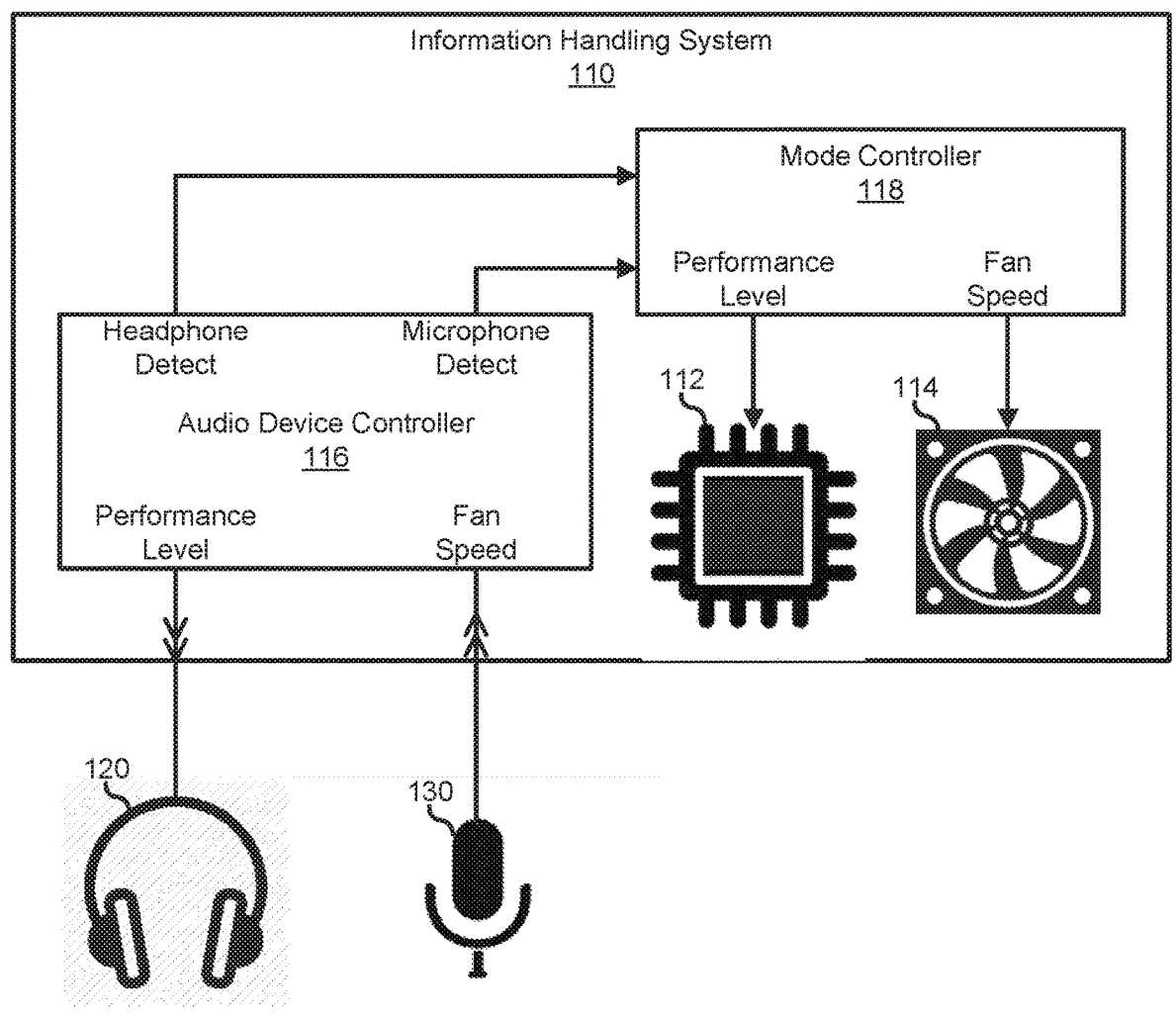
FIG. 1 is a block diagram illustrating an information handling system according to an embodiment of the present disclosure.

FIG. 1 illustrates a computing system 100 including an information handling system 110 to which an external headphone 120 and an external microphone 130 may be connected. Information handling system 110 includes a processor 112, and a cooling fan 114, an audio device controller 116, and a mode controller 118. Processor 112 represents various computing hardware typically utilized in an information handling system, and can include one or more central processing unit, various volatile and non-volatile data storage devices such as Dual In-Line Memory Modules (DIMMS), Solid-State Drives (SSDs), disk drives, and the like, various human input devices (HIDs) such as a keyboard, a mouse, a touch pad or touch screen, and the like, various wired and wireless network devices such as an Ethernet interface, a wireless interface, and the like. Processor 112 also represents various firmware and software components typically utilized in an information handling system, and can include a system Basic Input/Output System (BIOS) or Universal Extensible Firmware Interface (UEFI) including various device firmware components, an operating system (OS), application software, utilities, routines, and the like. Fan 114 represents an active cooling device that operates to provide a flow of ambient air to cool the components of information handling system 100.

Audio device controller 116 represents various hardware elements for receiving, processing, and outputting audio information. As such, audio device controller 116 operates to detect whether or not headphone 120 has been plugged into information handling system 110, and if so, to process audio data received from processor 112 into analog sound information to be provided to the headphone. Further, audio device controller 116 operates to detect whether or not microphone 130 has been plugged into information handling system 110, and if so, to process analog sound information received by the microphone into audio data to be provided to processor 112. Audio device controller 116 also represents various firmware and software components for controlling the characteristics related to the operation of headphone 120 and microphone 130. For example, audio device controller 116 can operate to control an output volume level, an input sensitivity or gain level, audio processing settings, and the like. The control of audio devices, such as of headphones and microphones, is known in the art and will not be further described herein, except as needed to illustrate the current embodiments. Audio device controller 116 operates to provide a headphone detect signal to mode controller 118 when headphone 120 has been plugged into information handling system 110, and to provide a microphone detect signal to the mode controller when microphone 130 has been plugged into the information handling system. It will be understood that information handling system 110 may include one or more hard-wired microphones embedded within the information handling system and integrated into the hardware of either processor 112 or audio device controller 116, as needed or desired. For the purposes of the present disclosure, it will be understood that, where information handling system 110 includes hard-wired microphones, audio device controller 116 may operate to provide the microphone detect signal only when the hard-wired microphone is enabled. Thus, as disclosed herein, the functions and features of audio device controller 116 will described with reference to microphone 130, but it should be understood that the functions and features of the audio device controller may also be ascribed to the operation of hard-wired microphones as well.

In terms of the hardware components of processor 112, the processor is characterized by the fact that a performance level can be selectable so as to offset other characteristics of information handling system 110. For example, a system BIOS may include configuration settings that permit a user to select one of, for example, five different performance levels (1-5), where "1" is a lowest performance level, and "5" is a highest performance level. It will be understood that, when the lowest (1) performance level is selected, information handling system 110 may operate without emitting excessive amounts of heat. On the other hand, when the highest (5) performance level is selected, information handling system 110 may emit excessive amounts of heat. Thus, when information handling system 110 represents, for example, a laptop computer, the user may face a trade-off between the performance level and the comfort of use of the laptop computer due to the high heat. The performance level of processor 112 is controlled by mode controller 118, as described below.

Further, fan 114 is characterized by the fact that a fan speed level can be selectable so as to offset other different characteristics of information handling system 110. For example, the system BIOS may include configuration settings that permit the user to select one of, for example, five different fan speed levels (1-5), where "1" is a lowest fan speed, and "5" is a highest fan speed. It will be understood that when the lowest (1) fan speed is selected, information handling system 110 may operate very quietly, because fan speed is correlated with the sound level produced by fan 114, whereas, when the highest (5) fan speed is selected, the information handling system may be very loud. Thus, continuing the previous example, the user of a laptop computer may face a trade-off between the fan speed level and the comfort of use of the laptop computer due to the loudness of fan 114. The performance level of fan 114 is controlled by mode controller 118, as described below.

Mode controller 118 represents an element of information handling system 110 that operates to control the performance level of processor 112 and the fan speed level of fan 114. As such, mode controller 118 represents a hardware component of information handling system 110 that operates to provide signals to processor 112 and fan 114 to change the performance and fan speed levels. The control of processor performance levels and fan speed levels is known in the art, and the details of processor performance level and fan speed management will not be further disclosed herein except as needed to describe the present embodiments.

In a particular embodiment, mode controller 118 operates in-band with processor 112. That is, the operation of mode controller 118 is provided based upon the execution by processor 112 of code that implements the functions and feature of the mode controller as described below. Here, mode controller 118 may also represent firmware or software instantiated on information handling system 110, such as a system BIOS or UEFI, device firmware, OS functionality, an application, or the like, that is configured to provide the functions and features of the mode controller as described below. In another embodiment, mode controller 118 operates out-of-band with processor 112. That is, the operation of mode controller 118 is provided based upon a hardware circuit that is independent of processor 112, or based upon the execution by a separate processor or controller of code that operates independently of the processor. In yet another embodiment, the functions and features of mode controller 118 may be provided by a combination of in-band and out-of-band elements, as needed or desired. An example of a mode controller may include an Intel Dynamic Power and Thermal Framework (DPTF), an ARM Intelligent Power Allocation framework, or the like.

In addition to the control of the performance level of processor 112 and the fan speed level of fan 114, as described above, mode controller 118 also operates to provide a framework for monitoring and managing the user experience of information handling system 110. In particular, mode controller 118 operates to provide management of the performance level and fan speed level based upon various user selectable modes. Here, the mode selection differs from the performance levels and fan speed levels, in that the selection of a mode leads to different combinations of the performance levels and fan speeds based upon a subjective choice of the user. For example, mode controller 118 may provide a user of information handling system 110 with the options to select an operating mode from among a list of modes that includes a "cool" mode, a "performance" mode, and a "quiet" mode. Here, the selection of one of the operating modes by a user functions to set limits on one or more of the operating characteristics of information handling system.

For example, when the cool mode is selected, mode controller 118 may control the operation of information handling system 110 so as to maintain an operating temperature of the information handling system below a particular temperature. Here, it will be understood that information handling system 110 may include one or more temperature sensors, and that one or more component of the information handling system may provide temperature information for that component. Further, the temperature may be related to a junction temperature of a particular component, a case temperature, or another temperature, as needed or desired. When the cool mode is selected, the settings for the performance level and for the fan speed level may be flexibly managed in order to maintain the target temperature. For example, when in the cool mode, mode controller 118 may first increase the fan speed level in an attempt to maintain the target temperature. If the fan speed is at a maximum level, then mode controller 118 may then reduce the performance level in a further attempt to maintain the temperature. Similarly, when the performance mode is selected, mode controller 118 may control the operation of information handling system 110 so as to maintain a highest possible performance level of the information handling system, at the expense of higher temperatures and higher fan speeds. Likewise, when the quiet mode is selected, mode controller 118 may control the operation of information handling system 110 so as to maintain a quietest possible operation of the information handling system, at the expense of lower performance and higher temperatures.

In a particular embodiment, mode controller 118 operates to receive headphone detect signal from audio device controller 116. Then, when headphone 120 has been plugged into information handling system 110 mode controller 118 operates to implement a "headphone" mode. Here, it will be understood that, when a user of an information handling system is using a device that is plugged into a headphone jack of the information handling system, then, because headphones typically emit sound directly into the user's ears, the presence of the device will dampen other exterior noises. For example, a typical pair of headphones or ear buds may decrease the exterior noise level by 1-2 sones. As such, where a user that is not utilizing headphones may be tolerant of a particular level of exterior noise, the same user may tolerate a greater amount of exterior noise when utilizing headphones. As such, when mode controller 118 sets information handling system 110 into the headphone mode, the mode controller operates to increase the maximum fan speed associated with the current operating mode. In a particular case, when mode controller 118 operates information handling system 110 in the quiet mode, the fan speed setting may normally be configured to operate at a maximum fan speed level of "2." However, when information handling system 110 is in the headphone mode, mode controller 118 may operate to set the maximum fan speed level to "3," thereby permitting fan 114 to be operated at a louder setting. This may also have a positive effect on the performance, because the higher fan speed may permit the operation of information handling system 110 at a higher performance level.

Figure 2:
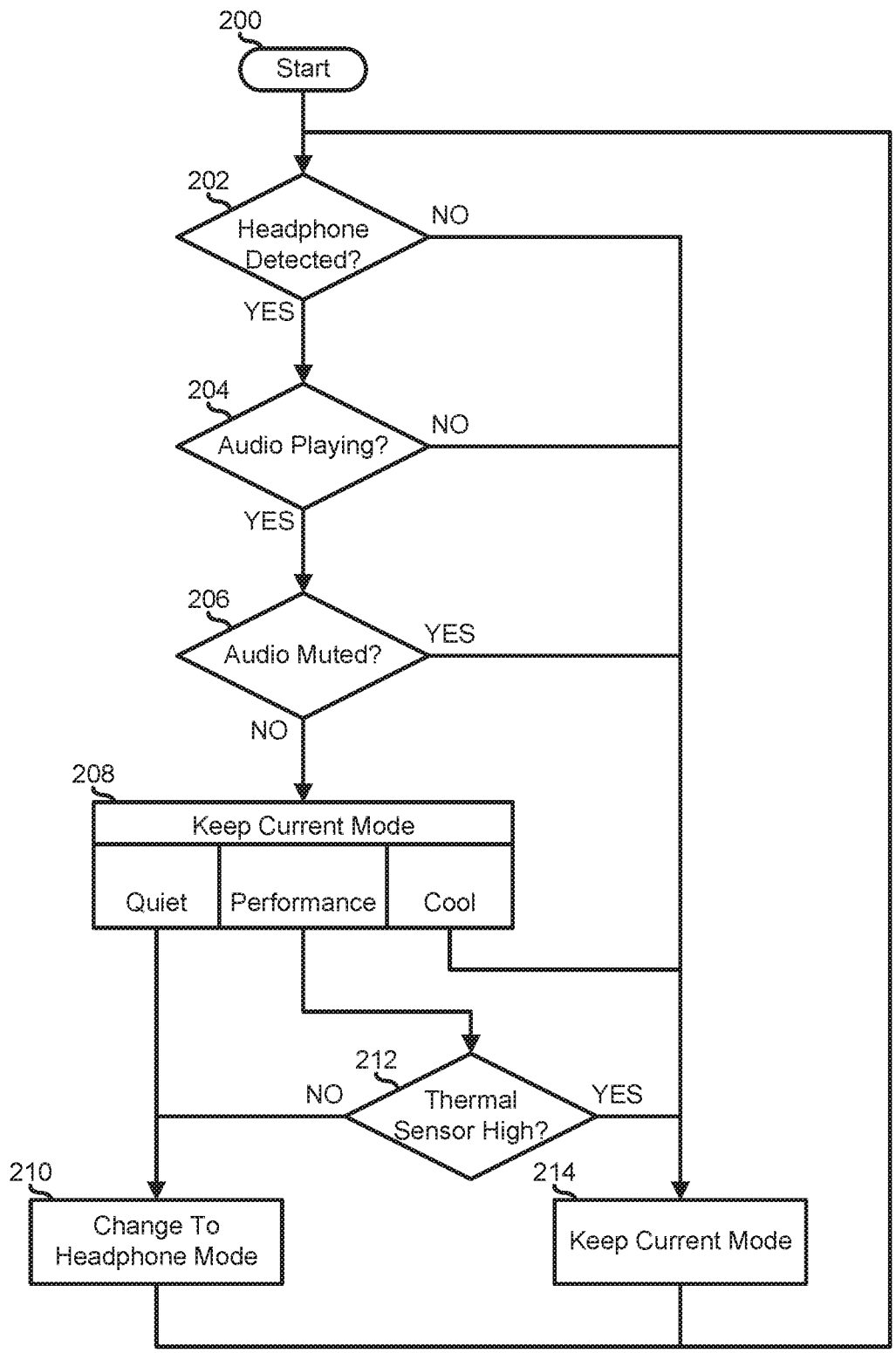
FIG. 2 is a flowchart illustrating a method for dynamic fan control under headphone detection according to an embodiment of the present disclosure.

FIG. 2 illustrates a method for dynamic fan control under headphone detection, starting at block 200. A decision is made as to whether or not a headphone is detected in decision block 202. If not, the "NO" branch of decision block 202 is taken, the current operating mode is maintained in block 214, and the method returns to decision block 202 until a headphone is detected. When a headphone is detected, the "YES" branch of decision block 202 is taken, and a decision is made as to whether or not audio is playing in the headphone in decision block 204. If not, the "NO" branch of decision block 204 is taken, the current operating mode is maintained in block 214, and the method returns to decision block 202. When audio is playing in the headphone, the "YES" branch of decision block 204 is taken and a decision is made as to whether or not the audio is muted in decision block 206. If so, the "YES" branch of decision block 206 is taken, the current operating mode is maintained in block 214, and the method returns to decision block 202.

When the audio is not muted, the "NO" branch of decision block 206 is taken and a decision is made as to whether the information handling system is in the quiet mode, the performance mode, or the cool mode in decision block 208. When the information handling system is in the quiet mode, the "quiet" branch of decision block 208 is taken, the information handling system is placed into the headphone mode in block 210, and the method returns to decision block 202. In an alternative embodiment, when the information handling system is in the quiet mode, the system is not placed into the headphone mode, but is maintained in the quiet mode. Here, a user may opt to keep the information handling system in the quiet mode regardless of whether or not the headphone is in use, for example when the information handling system is desired to be kept in the quiet mode for the convenience of others in the vicinity of the information handling system. When the information handling system is in the cool mode, the "cool" branch of decision block 208 is taken, the current operating mode is maintained in block 214, and the method returns to decision block 202. When the information handling system is in the performance mode, the "performance" branch is taken and a decision is made as to whether or not a temperature sensor is reading above a temperature limit in decision bock 212. If not, the "NO" branch of decision block 212 is taken, the information handling system is placed into the headphone mode in block 210, and the method returns to decision block 202. If the temperature sensor is reading above a temperature limit, the "YES" branch of decision bock 212, the current operating mode is maintained in block 214, and the method returns to decision block 202.

In another embodiment, mode controller 118 operates to receive microphone detect signal from audio device controller 116. Then, when microphone 130 has been plugged into information handling system 110 mode controller 118 operates to implement a "microphone" mode. Here, where a user that is not utilizing a microphone may be tolerant of a particular level of exterior noise, that level of exterior noise may be picked up by the microphone when recording or participating in a video chat. As such, when mode controller 118 sets information handling system 110 into the microphone mode, the mode controller operates to decrease the maximum fan speed associated with the current operating mode. In a particular case, when mode controller 118 operates information handling system 110 in the cool mode, the fan speed setting may normally be configured to operate at a maximum fan speed level of "5." However, when information handling system 110 is in the headphone mode, mode controller 118 may operate to set the maximum fan speed level to "3," thereby permitting fan 114 to be operated at a quieter setting. In another embodiment, mode controller 118 operates to manipulate the fan speed level while listening to the input from microphone 130. Here, mode controller 118 operates to detect a threshold fan speed level, below which microphone 130 is unable to detect the fan noise.

Figure 3:
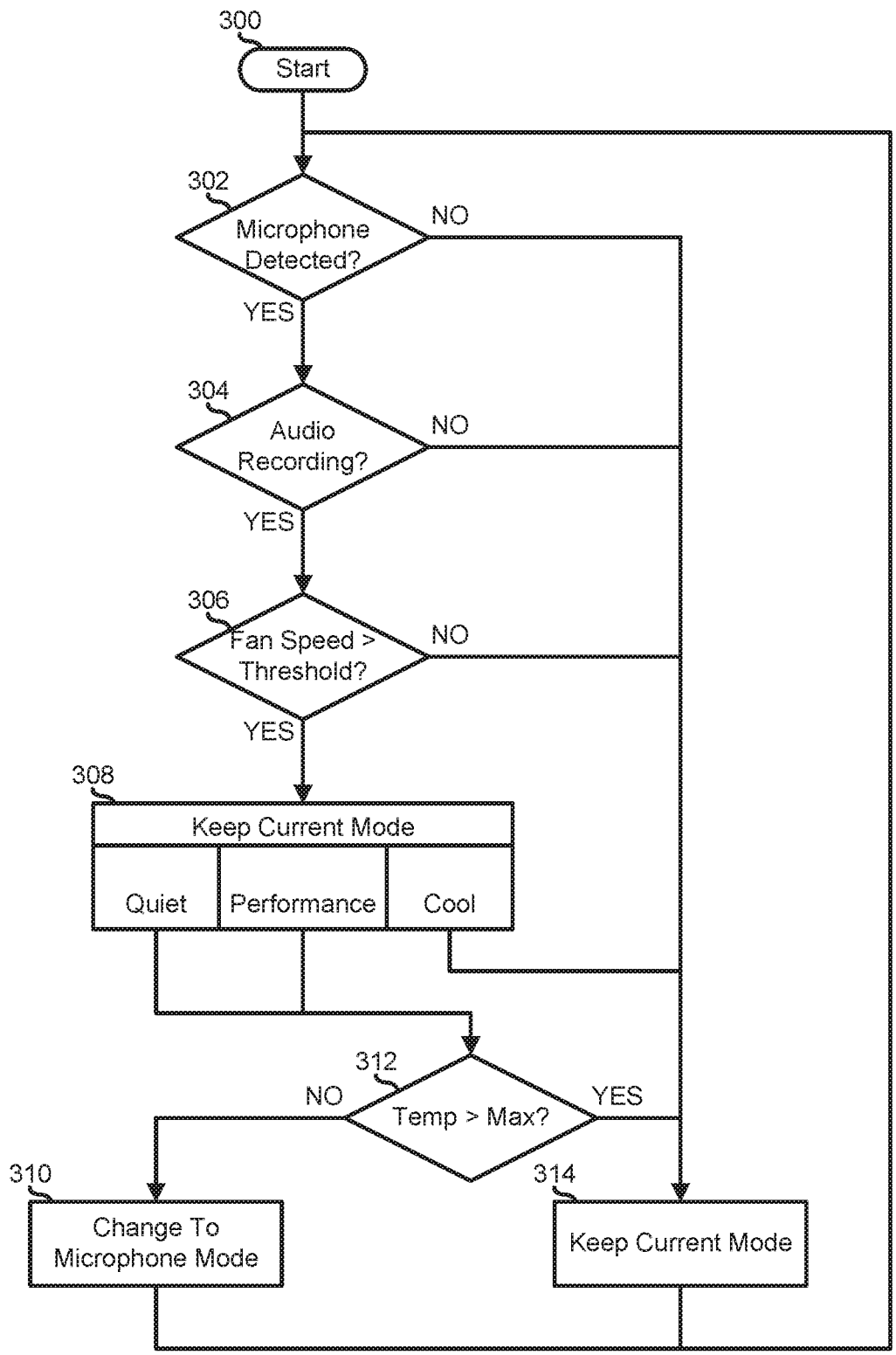
FIG. 3 is a flowchart illustrating a method for dynamic fan control under microphone detection according to an embodiment of the present disclosure.

FIG. 3 illustrates a method for dynamic fan control under microphone detection, starting at block 300. A decision is made as to whether or not a microphone is detected in decision block 302. If not, the "NO" branch of decision block 302 is taken, the current operating mode is maintained in block 314, and the method returns to decision block 302 until a microphone is detected. When a microphone is detected, the "YES" branch of decision block 302 is taken, and a decision is made as to whether or not audio is being recorded in the microphone in decision block 304. If not, the "NO" branch of decision block 304 is taken, the current operating mode is maintained in block 314, and the method returns to decision block 302. When audio is being recorded in the microphone, the "YES" branch of decision block 304 is taken and a decision is made as to whether or not the fan speed level is greater than a threshold fan speed level in decision block 306. If not, the "NO" branch of decision block 306 is taken, the current operating mode is maintained in block 314, and the method returns to decision block 302.

When the fan speed level is greater than the threshold fan speed level, the "YES" branch of decision block 306 is taken and a decision is made as to whether the information handling system is in the quiet mode, the performance mode, or the cool mode in decision block 308. When the information handling system is in the quiet mode, the "quiet" branch of decision block 308 is taken and a decision is made as to whether or not a temperature sensor is reading greater than a maximum temperature in decision block 312. If so, the "YES" branch of decision block 312 is taken, the current operating mode is maintained in block 314, and the method returns to decision block 302. If the temperature sensor is not reading greater than the maximum temperature, the "NO" branch of decision block 312, the information handling system is placed into the microphone mode in block 310, and the method returns to decision block 302. Likewise, when the information handling system is in the performance mode, the "performance" branch of decision block 308 is taken and the method proceeds to decision bock 312, as described above. When the information handling system is in the cool mode, the "cool" branch of decision block 308 is taken, the current operating mode is maintained in block 314, and the method returns to decision block 302.

Figure 4:
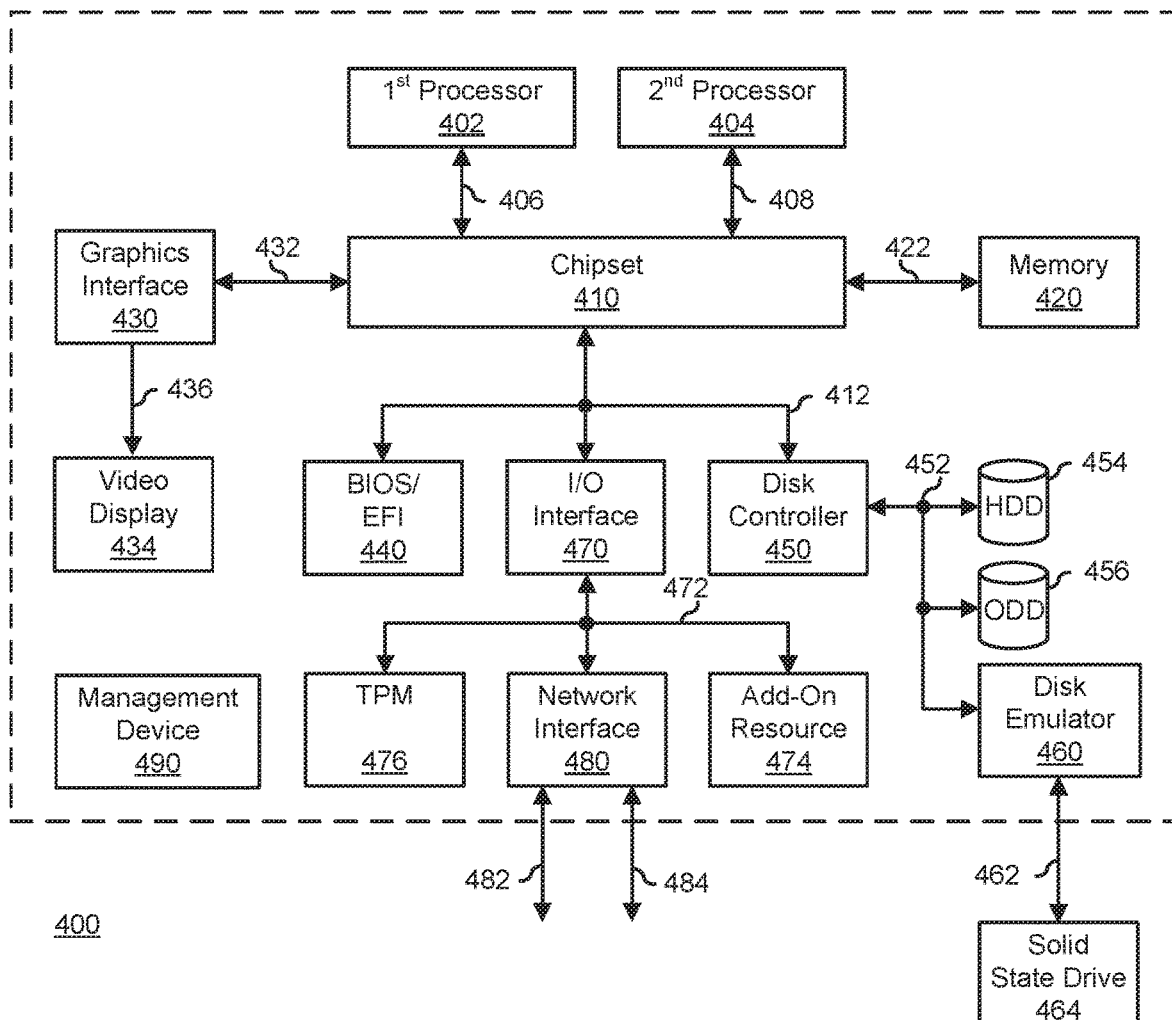
FIG. 4 is a block diagram illustrating an information handling system according to another embodiment of the present disclosure.

FIG. 4 illustrates a generalized embodiment of an information handling system 400 similar to information handling system 110. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, a chipset 410, a memory 420, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an input/output (I/O) interface 470, one or more add-on resources 474, a trusted platform module (TPM) 476, a network interface 480, a management device 490, and a power supply 495. Processors 402 and 404, chipset 410, memory 420, graphics interface 430, BIOS/UEFI module 440, disk controller 450, HDD 454, ODD 456, disk emulator 460, SSD 462, I/O interface 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to add-on resource 474, to TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 may include a commercially available BMC product that operates in accordance with an Intelligent Platform Management Initiative (IPMI) specification, such as a Integrated Dell Remote Access Controller (iDRAC), or the like. Management device 490 may further include associated memory devices, logic devices, security devices, or the like, as needed or desired.

Power supply 495 represents one or more devices for power distribution to the components of information handling system 400. In particular, power supply 495 can include a main power supply that receives power from an input power source, such as a wall power outlet, a power strip, a battery, or another power source, as needed or desired. Here, power source 495 operates to convert the power at a first voltage level from the input power source to one or more power rails that are utilized by the components of information handling system. Power supply 495 can also include one or more voltage regulators (VRs) that each receive power from the main power supply and that operate to convert the input voltage to an output voltage that is used by one or more components of information handling system. For example, a VR can be provided for each of processors 402 and 404, and another VR can be provided for memory 420. Power supply 495 can be configured to provide a first power plane that provides power to the host environment, and to provide a second power plane that provides power to the management environment.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processor configurable to be operated in one of a plurality of performance levels;
   a cooling fan configurable to be operated in one of a plurality of fan speed levels;
   a connector to which a headphone device can be connected; and
   a mode controller configured to:
      set the cooling fan in a first one of the fan speed levels;
      set the processor in a first one of the performance levels;
      receive a first indication that the headphone device is connected to the connector;
      in response to receiving the first indication, determine whether or not the information handling system is in a first operating mode, wherein the first operating mode is associated with a quiet operation of the information handling system, and in response to determining that the information handling system is in the first operating mode, to:
         maintain the cooling fan in the first fan speed level;
         maintain the processor in the first performance level; and
         detect that the information handling system has changed to a second operating mode, wherein the second operating mode is associated with a high performance operation of the information handling system; and
      in response to detecting that the information handling system is in the second operating mode, to:
         determine whether or not a thermal sensor reading of the information handling system is high;
         set the cooling fan in a second one of the fan speed levels, the second fan speed level being a higher fan speed level than the first fan speed level in response to determining that the thermal sensor reading is not high; and
         set the processor in a second one of the performance levels, the second performance level being a higher performance level than the first performance level in further response to determining that the thermal sensor reading is not high.

2. The information handling system of claim 1, wherein the mode controller is further configured to:
receive a second indication that the headphone device is no longer connected to the connector; and
set the cooling fan in the first fan speed level in response to receiving the second indication.

3. The information handling system of claim 1, wherein the mode controller is further configured to:
receive a second indication that audio information is being provided to the headphone device, wherein setting the cooling fan to the second fan speed is in further response to receiving the second indication.

4. The information handling system of claim 3, wherein the mode controller is further configured to:
receive a third indication that the audio information is no longer being provided to the headphone device; and
set the cooling fan in the first fan speed levels in response to receiving the third indication.

5. The information handling system of claim 3, wherein the mode controller is further configured to:
receive a third indication that the audio information is not being muted, wherein setting the cooling fan to the second fan speed is in further response to receiving the third indication.

6. The information handling system of claim 5, wherein the mode controller is further configured to:
receive a fourth indication that the audio information is being muted; and
set the cooling fan in the first fan speed levels in response to receiving the fourth indication.

7. The information handling system of claim 1, wherein the mode controller is further configured to:
receive a second indication that the headphone device is no longer connected to the connector; and
set the processor in the first performance level in response to receiving the second indication.

8. The information handling system of claim 1, further comprising:
a headphone controller configured to detect that the headphone device is connected to the connector and to provide the first indication to the mode controller.

9. The information handling system of claim 1, wherein the mode controller comprises a baseboard management controller.

10. A method, comprising:
setting, by a mode controller of an information handling system, a cooling fan to be operated in a first one of a plurality of fan speed levels:
setting a processor of the information handling system to a first one of a plurality of performance levels;
receiving a first indication that a headphone device is connected to a connector of the information handling system; and
in response to receiving the first indication, determining that the information handling system is in a first operating mode, wherein the first operating mode is associated with a quiet operation of the information handling system, and in response to determining that the information handling system is in the first operating mode:
maintaining the cooling fan in the first fan speed level;
maintaining the processor in the first performance level; and
detecting that the information handling system has changed to a second operating mode, wherein the second operating mode is associated with a high performance operation of the information handling system; and
in response to detecting that the information handling system is in the second operating mode:
determining whether or not a thermal sensor reading of the information handling system is high;
setting the cooling fan in a second one of the plurality of fan speed levels, the second fan speed level being a higher fan speed level than the first fan speed level in response to determining that the thermal sensor reading is not high; and
setting the processor in a second one of the plurality of performance levels, the second performance level being a higher performance level than the first performance level in further response to determining that the thermal sensor reading is not high.

11. The method of claim 10, further comprising:
receiving a second indication that the headphone device is no longer connected to the connector; and
setting the cooling fan in the first fan speed level in response to receiving the second indication.

12. The method of claim 10, further comprising:
receiving a second indication that audio information is being provided to the headphone device, wherein setting the cooling fan to the second fan speed is in further response to receiving the second indication.

13. The method of claim 12, further comprising:
receiving a third indication that the audio information is no longer being provided to the headphone device; and
setting the cooling fan in the first fan speed levels in response to receiving the third indication.

14. The method of claim 12, further comprising:
receiving a third indication that the audio information is not being muted, wherein setting the cooling fan to the second fan speed is in further response to receiving the third indication.

15. The method of claim 14, further comprising:
receiving a fourth indication that the audio information is being muted; and
setting the cooling fan in the first fan speed levels in response to receiving the fourth indication.

16. The method of claim 9, further comprising:
receiving a second indication that the headphone device is no longer connected to the connector; and
setting the processor in the first performance level in response to receiving the second indication.

17. The method of claim 10, wherein the mode controller comprises a baseboard management controller.

18. An information handling system, comprising:
a processor configurable to be operated in one of a plurality of performance levels;
a cooling fan having a plurality of speeds:
a connector to which a microphone can be connected; and
a mode controller configured to:
set the cooling fan to a first one of the speeds;
set the processor in a first one of the performance levels;
in response to receiving an indication that the microphone is connected to the connector, determine whether or not the information handling system is in a first operating mode, wherein the first operating mode is associated with a quiet operation of the information handling system, and in response to determining that the information handling system is in the first operating mode, to:
maintain the cooling fan in the first speed; and
maintain the processor in the first performance level; and
detect that the information handling system has changed to a second operating mode, wherein the second operating mode is associated with a high performance operation of the information handling system; and
in response to detecting that the information handling system is in the second operating mode, to:
  determine whether or not a thermal sensor reading of the information handling system is high;
  set the cooling fan to a second one of the speeds, the second speed being a higher speed than the first speed in response to determining that the thermal sensor reading is not high; and
  set the processor in a second one of the performance levels, the second performance level being a higher performance level than the first performance level in further response to determining that the thermal sensor reading is not high.

* * * * *